United States Patent
Vezain et al.

(10) Patent No.: US 6,298,662 B1
(45) Date of Patent: Oct. 9, 2001

(54) DEVICE FOR CONTROLLING A RELATIVE ROTATION BETWEEN TWO ARTICULATED ELEMENTS AND A DEPLOYABLE MECHANICAL STRUCTURE, PARTICULARLY FOR A SPACE VEHICLE, USING AT LEAST ONE DEVICE OF THIS TYPE

(75) Inventors: Gérard Vezain, Mandelieu; Patrice Kerhousse, Nice; Daniel Viale, Tanneron; Yannick Baudasse, La Bocca; François Reimbold, Le Cannet, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/647,839

(22) PCT Filed: Apr. 2, 1999

(86) PCT No.: PCT/FR99/00774

§ 371 Date: Oct. 27, 2000

§ 102(e) Date: Oct. 27, 2000

(87) PCT Pub. No.: WO99/51878

PCT Pub. Date: Oct. 14, 1999

(30) Foreign Application Priority Data

Apr. 6, 1998 (FR) .................................................. 98 04242

(51) Int. Cl.$^7$ ....................................................... F01B 29/10
(52) U.S. Cl. .................................................. 60/527; 60/528
(58) Field of Search ............................... 60/527, 528, 529

(56) References Cited

U.S. PATENT DOCUMENTS

| 3,733,758 | 5/1973 | Maier et al. . |
| 4,798,051 | 1/1989 | Foote . |
| 5,127,228 | 7/1992 | Swenson . |

FOREIGN PATENT DOCUMENTS

| 41 13 504 A1 | 11/1992 | (DE) . |
| 2 684 638 A1 | 6/1993 | (FR) . |
| 2 761 116 A1 | 9/1998 | (FR) . |

*Primary Examiner*—Hoang Nguyen
(74) *Attorney, Agent, or Firm*—Pearne & Gordon LLP (57) ABSTRACT

To control a relative rotation between two elements (10, 12), such as flaps of a deployable mechanical structure, on a space vehicle, a torsion bar (16) is used made of a bistable shape memory alloy, heated over its whole length by heaters stuck on the bar and retained by hooping rings. A stop (22) restricts pivoting to the pre-set pivoting angle to be controlled. Excess pivoting of the torsion bar (16) is applied to a mechanical fuse (18), interposed between the bar and one (12) of the elements.

9 Claims, 7 Drawing Sheets

DEVICE FOR CONTROLLING A RELATIVE ROTATION BETWEEN TWO ARTICULATED ELEMENTS AND A DEPLOYABLE MECHANICAL STRUCTURE, PARTICULARLY FOR A SPACE VEHICLE, USING AT LEAST ONE DEVICE OF THIS TYPE

TECHNICAL FIELD

The invention mainly concerns a device designed to control a relative rotation between two elements articulated relative to each other around a given axis.

The invention also concerns a deployable mechanical structure, such as a solar array, a radiator or an antenna on a space vehicle, the deployment of which is controlled by means of one or more devices of this type.

The invention finds a favoured application in the context of the folding mechanism of the different mechanical structures which are fitted to space vehicles (satellites, space probes, etc.). It can however also be used in other fields, since the deployment or folding up of a mechanical structure must be able to be controlled, with high torque and high. amplitude, by means of a compact device built into the structure.

STATE OF THE ART

When a space vehicle is launched, it is necessary to keep a certain number of pieces of equipment such as solar arrays, radiators, antennae or the like, in the folded up position. Indeed, this configuration allows them to withstand the loads induced by the launch and to be compatible with the restricted volume which is allocated to them on the launcher. Devices providing this retention in the folded position are generally called "stacking devices".

A space vehicle must therefore comprise deployment control devices, which are activated when the vehicle is in orbit, after the stacking devices have been unlocked.

Most current deployment control devices use either pre-stressed springs, or electric motors.

When a spring folding mechanism is used, substantial jarring occurs at the end of deployment, which may damage or disturb the mechanism of the equipment stowed on the space vehicle. To overcome this disadvantage, a control unit is frequently added to spring control devices. However, this reduces the reliability of the mechanism.

When an electric motor is used to control deployment, there are fitting constraints associated with the space requirement of the motor. Moreover, the unit constituted by the motor and by its electronic control system substantially increases the cost of the equipment and, consequently, of the space vehicle.

In document FR-A-2 684 638, a proposal was made to mechanise the deployment of a mechanical structure by means of a torsion spring, an elongation torque plate or arm, made of a bistable shape memory alloy. The change in metallurgical structure is obtained either by heating the motor part locally at one of its ends, or by heating it uniformly, but in a controlled way. A locking device keeps the structure in its final deployed state, when it reaches this configuration.

The use of a motor component made of a shape memory alloy, to control the deployment of a space vehicle mechanical structure, eliminates the disadvantages arising from the use of pre-stressed springs or electric motors. However, the solutions advocated in the document FR-A-2 684 638 have a certain number of disadvantages.

Thus, when a torsion spring is used, it is necessary to resort to a heavy and bulky spring to produce high capacity and to generate a high rotation torque.

When the motor component is in the form of a plate, it is practically impossible to control high deployment angles.

Lastly, the use of a torque arm requires a mechanical gear ratio which is restricting in terms of mass and space occupied.

Furthermore, when the heating of the motor component is carried out uniformly, document FR-A-2 684 638 proposes to guide the heating so as to control the deployment kinematics. This imposes complex and costly control electronics.

Also, in the case where the motor component is heated at one end, the natural heat propagation along this component is expressed by very high temperatures at the level of the heating device, by virtue of the steep temperature gradient between the two ends of the motor component.

Lastly, given that the deployment of the mechanical structure is generally locked at the end of its travel, when the required deployment angle is reached, the torque generated by the motor component is withstood by this same component and may cause it to break, after the stop is reached. This disadvantage can only be eliminated if the locking and heating cut-off are synchronised, which serves to complicate still further the device and its electronic control unit.

DISCLOSURE OF THE INVENTION

The main object of the invention is a device allowing the control of a relative rotation between two elements by means of a motor component made of a bistable shape memory alloy, so as to benefit from the advantages arising from the use of such a component, while allowing a high rotation torque to be generated and a high deployment angle to be attained, for a relatively low space requirement, weight and cost.

In accordance with the invention, this result is obtained by means of a device for controlling a relative rotation between two elements articulated relative to each other around a given axis, the device including a torsion bar made of a bistable shape memory alloy, centred on said axis and connected to each of the elements at points spaced out along said axis, and bar heating means, activation of which generates said relative rotation, under the effect of a change in the metallurgical structure of the alloy, the device being characterised in that the torsion bar is able to generate an angle of relative rotation between said points on the bar, greater than a pre-set relative rotation angle to be controlled between the elements, a stop being provided to restrict the relative rotation angle between the elements to the pre-set angle, and at least one mechanical fuse being provided between the torsion bar and a first of said elements, to absorb excess relative rotation between said points on the bar, beyond said pre-set angle.

The use of a motor component constituted by a bar made of a bistable shape memory alloy, working in torsion, allows a high rotation torque to be generated and a high deployment angle to be attained, for a particularly low space requirement and remaining weight. In the event of the device according to the invention being used in parallel with an resilient deployment system (for example a solar array with several flaps of which several articulation lines are spring mechanised) the bistable shape memory alloy bar can allow surplus in the folding mechanism to be brought to bear to help the deployment of a failing articulation line, thanks to additional transmission elements (for example, pulleys and interlinking cables). Moreover, it is not necessary to resort to a complex electronic control unit, since the heating of the torsion bar is carried out without it being necessary to control it or guide it. Also, a control device designed in this way has great reliability, and is remarkably straightforward to operate and fit.

Moreover, the presence of a mechanical fuse and a stop allows the torque to be absorbed which continues to be generated by the torsion bar when the two elements reach the stop. The integrity of the bar is thus preserved, without it being necessary to synchronise the locking and the cut-off of the heating.

Preferably, the mechanical fuse is constituted by a rod of smaller cross section than the torsion bar, which extends the latter along the articulation axis of the two elements and the ends of which are connected in rotation to one end of the bar and to the first element respectively.

A resilient means such as a spring is then advantageously interposed between the rod and the first element, so as to act upon the latter towards the torsion bar, along the above-mentioned axis.

To ensure operational reliability in orbit, the fuse may possibly be replaced before the launch by a very resistant part in order to avoid premature fracture of said fuse in the event of a friction point being encountered during the last deployment.

In the preferred embodiment of the invention, the heating means include heaters distributed over the whole length of the torsion bar, stuck onto it and individually retained by hooping rings.

Furthermore, a reverse running stop locking mechanism is provided to oppose any reverse rotation, after said relative rotation between the elements.

The invention also concerns a deployable mechanical structure, including at least two elements connected to each other by at least one articulation and initially occupying a folded configuration, and at least one control device according to the invention, built into said articulation, able to bring the structure into an at least partially deployed configuration.

Compared with conventional folding mechanism techniques, with oversize springs, and in addition to the advantages already mentioned, this arrangement allows a considerable increase (for example at least a fourfold increase) in the folding mechanism margin, that is the ratio between the engine torque and the resisting torque. Indeed, the operational speed of the device is very slow, whatever the value of the torque applied, with the result that no lock jarring occurs.

When the deployable mechanical structure includes at least three elements connected to each other by at least one articulation, at least one control device is built into one of these articulations and interlocking means connect the articulations to each other, so that activating the control device brings all the elements of the structure into the deployed configuration.

When a partial deployment of at least one last element of such a deployable mechanical structure is to take place, for example in the transfer phase of a space vehicle on which the structure is stowed, at least a first control device is built into a first articulation connecting the last element of the structure to an adjacent element, to control the partial deployment of this last element. At least one second control device is then also built into a second articulation of the structure, to bring it into its deployed configuration, through the interlocking means.

The second control device is then advantageously connected to the last element of the structure through play take-up means able to engage when the partial deployment of the last element has been controlled by the first control device.

BRIEF DESCRIPTION OF THE DRAWINGS

A description will now be given, as a non restrictive example, of a preferred embodiment of the invention, by reference to the appended drawings, in which.

DETAILED DESCRIPTION OF A PREFERRED EMBODIMENT OF THE INVENTION

Figures 1A, 1B, 1C:
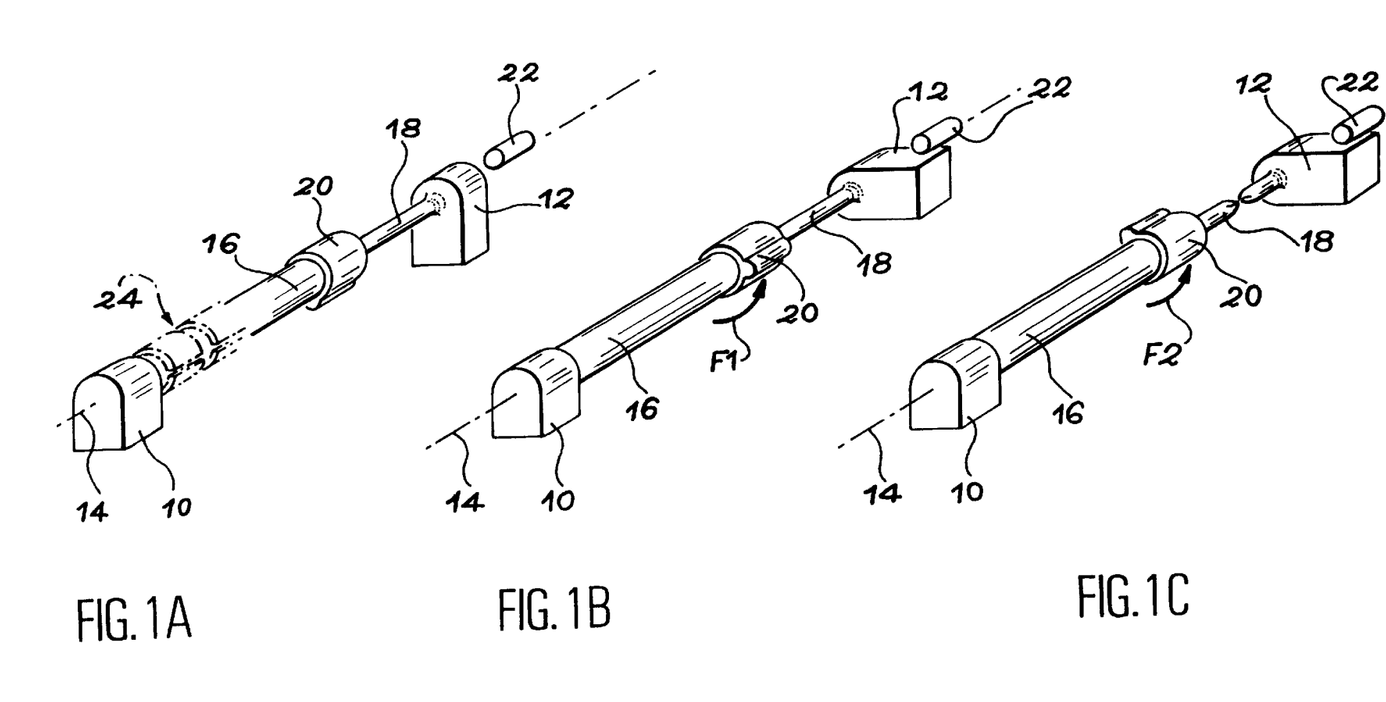
FIGS. 1A, 1B and 1C show in a very diagrammatic way, in perspective, a control device according to the invention, in its initial off-configuration, when the pre-set angle of relative rotation to be controlled is reached, and at the end of the activation of the device respectively.

In FIGS. 1A to 1C, has been shown very diagrammatically a control device according to the invention, activating which induces a high torque allowing a high relative rotation angle to be generated between a first element 10, supposed fixed and a second element 12 to be engaged, around an axis 14.

The control device according to the invention mainly includes a torsion bar 16, of an extended cylindrical shape, made of a bistable shape memory alloy. The torsion bar 16 is centred on the axis 14 around which a pre-set relative rotation between the elements 10 and 12 is to be controlled.

Heating means of the torsion bar 16 are provided, to control the activation of the device. These heating means are shown diagrammatically as 24 in FIG. 1A. They have not been shown in FIGS. 1B and 1C. These heating means 24 will be described subsequently by reference to FIG. 2.

A first end of the torsion bar 16 is connected directly in rotation to the fixed element 10. The second end of the bar 16 is connected to the mobile element 12 by means of a mechanical fuse the function of which will emerge subsequently.

The mechanical fuse is constituted by a cylindrical rod 18, also centred on the axis 14 and placed in the extension of the torsion bar 16. The cylindrical rod 18 is of approximately smaller cross section than the torsion bar 16, and if is made of a different, particularly ductile, material which allows it to distort and, if necessary, to break, when torque is applied to it.

The adjoining ends of the torsion bar 16 and of the cylindrical rod 18 are connected to each other in rotation by means of a connection support plate 20. The other end of the cylindrical rod 18 is connected to the element 12 in rotation.

The relative rotation between the elements 10 and 12 is restricted to a pre-set angle by a stop shown diagrammatically as 22 in FIGS. 1A to 1C. This stop can be built into the device, or external to it, without departing from the scope of the invention.

The use of a bar 16 of a bistable shape memory alloy, working in torsion, allows high amplitude rotations (above 180°) to be generated with high torque, during the change in the metallurgical structure of the alloy, induced by its heating. However the mass and space occupied by the device are reduced.

The bar 16 is pre-trained in torsion, such that it moves steadily and slowly from the shape shown in FIG. 1A to the shape shown in FIG. 1C when it is heated by the heating means 24, so as to exceed its metallurgical structure change temperature.

FIG. 1A shows the device in its state of rest, in other words before the activation of the heating means 24. The temperature of the device is then lower than the metallurgical structure change temperature of the alloy of which the torsion bar 16 is made.

When a constant heating power (not controlled or guided) is applied to the torsion bar 16 through heating means 24, distributed all along this bar so as to provide homogeneous heating, the bar begins to change metallurgical structure at a temperature T0 and this conversion ends at a temperature T1. The values of these temperatures depend essentially on the nature of the bistable shape memory alloy used.

When the conversion start temperature T0 of the metallurgical structure of the alloy is reached, the relative rotation between the elements 10 and 12 begins. Supposing that the element 10 is fixed, as has been shown in FIGS. 1A to 1C, this means that the connection support plate 20 and the element 12 connected to this support plate through the fuse 18 begins to rotate slowly around the axis 14, for example in the direction of the arrow F1 in FIG. 1B. Given that the phase change of the shape memory alloy is strongly endothermic, the torsion bar 16 generates its torque in accordance with the natural increase in temperature provided by the heating means 24.

In practice, the final position of the torsion bar 16, in other words the final relative rotation angle reached when the metallurgical conversion of the alloy is completed, is difficult to control in the context of a non unitary manufacture. Indeed, to perfectly reproduce the shape recovery of the bars is practically impossible. To overcome this difficulty, a torsion bar 16 is used of which the final relative rotation angle is greater (for example by about 10°) than the pre-set relative rotation angle which it is desired to control between elements 10 and 12.

Consequently, when this pre-set relative rotation angle to control between elements 10 and 12 is reached, as shown in FIG. 1B, the rotation of the connection support plate 20 around the axis 14, relative to the element 10 is not completed. The function of the stop 22 is then to restrict the relative rotation between the elements 12 and 14 to the pre-set angle that it is desired to reach.

As shown by the arrow F2 in FIG. 1C, the continuation of the metallurgical conversion of the alloy in which the torsion bar 16 is formed then has the effect of rotating the connection support plate 20 around the axis 14 relative to the elements 10 and 12, which are then both immobile. The function of the fuse 18 is then to absorb the torque which continues to be generated by the bar 16, by twisting on itself, then possibly by breaking, as has been shown. In the event of breakage of the fuse 18, resilient means such as a spring (not shown) allow the parts then released to be kept in place.

Thus the situation is avoided whereby the excess torque generated by the torsion bar 16, after the element 12 comes to be supported against the stop 22, is borne by the torsion bar 16 itself. Any risk of fracturing this bar is thus eliminated. This particularly allows the torsion bar 16 to be reconditioned and reused, if required.

As will be seen in more detail below, reverse running stop locking means are provided to advantage, so as to keep the elements 10 and 12 in their relative angular position reached after the device has been activated.

Figure 2:
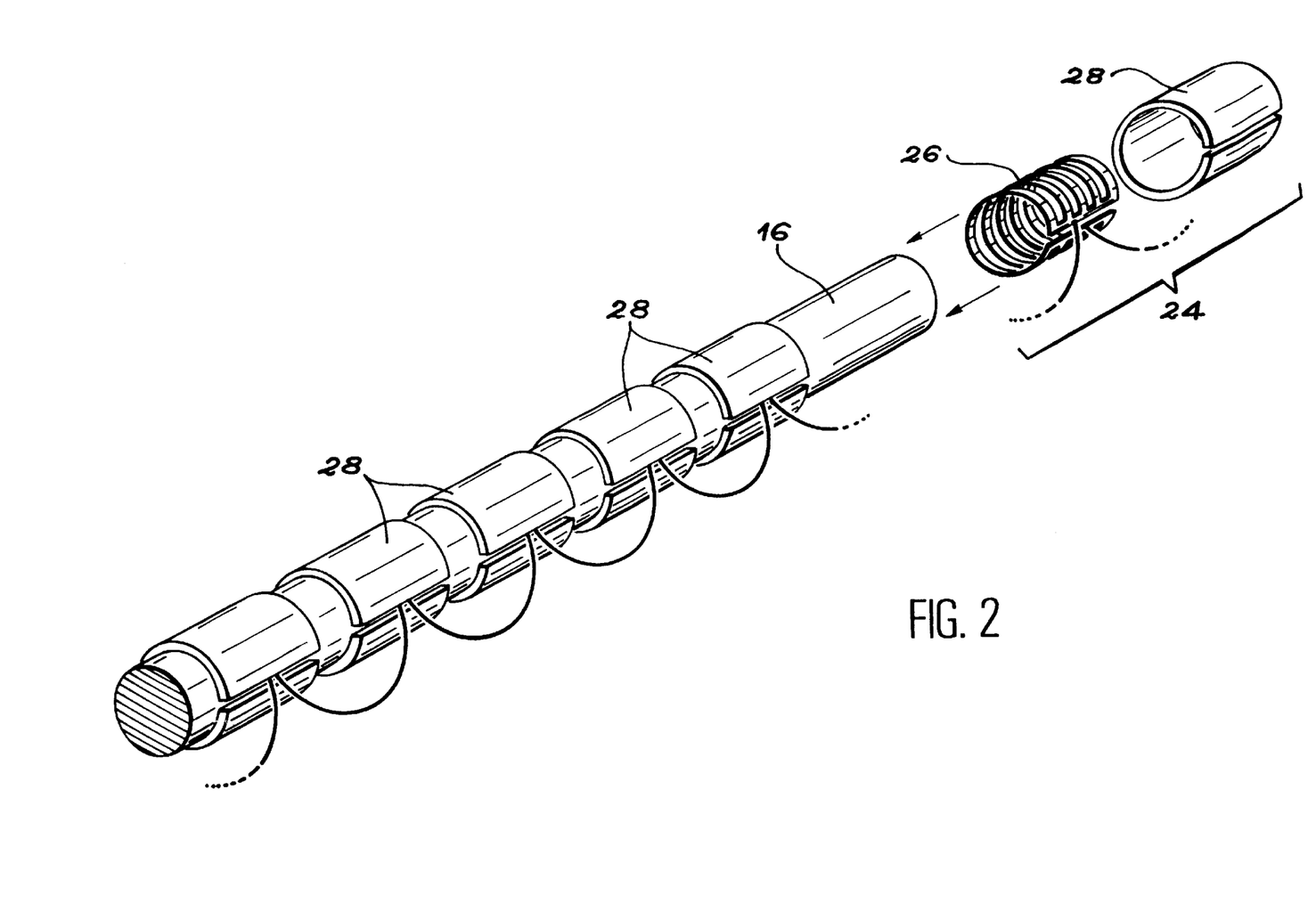
FIG. 2 is a perspective view, which shows in more detail the installation of the heating means on the torsion bar of the control device in FIGS. 1A to 1C.

A preferred embodiment of the heating means 24 will now be described with reference to FIG. 2.

As this figure shows, these heating means 24 include a set of heaters constituted by resistors 26, distributed all along the bar 16 and stuck on it. Each of the heaters 26 is surrounded and retained individually against the bar 16 by a hooping ring 28. These hooping rings allow the heaters 26 to withstand the substantial shear stresses generated by the bar 16 torsion, when the device is activated.

It should be noted that the heaters 26, distributed all along the bar 16, provide for its homogeneous heating, by conduction. This makes it possible to prevent the formation of substantial gradients during heating and, consequently, the introduction of high internal stresses which are inevitable in the presence of such temperature gradients. The homogeneous conduction heating provided by the heaters 26 also makes it possible to bring sufficient power to minimise the sensitivity of the operation to thermal conduction leakage (at the bar ends) and radiative leakage, while optimising the duration of the heating.

To increase the reliability of the heating means 24, the heaters 26 are to advantage connected in parallel. In the event of a malfunction of one or more of the heaters 26, the device can be activated all the same, by means of the non-defective heaters.

A description will now be given, by referring successively to FIGS. 3 to 9B, of an example of the application of the relative rotation control device according to the invention to a solar array fitted to a space vehicle.

Figure 3:
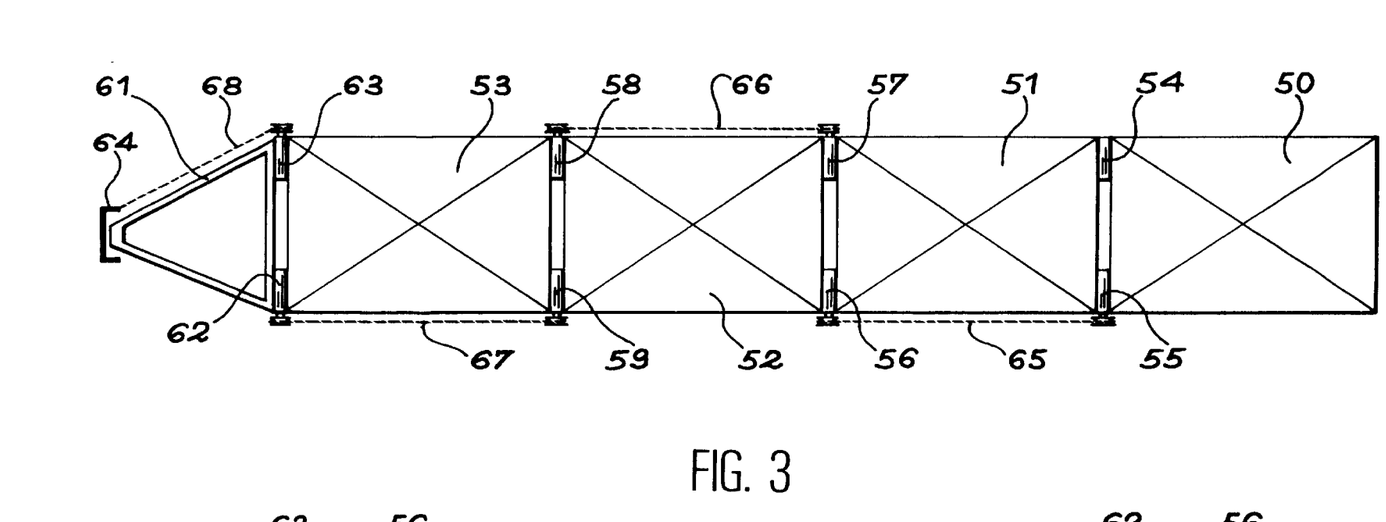
FIG. 3 is a front view which shows, in the deployed configuration, a space vehicle solar array of which the deployment control is provided in two phases by means of two control devices according to the invention.
Figure 4:
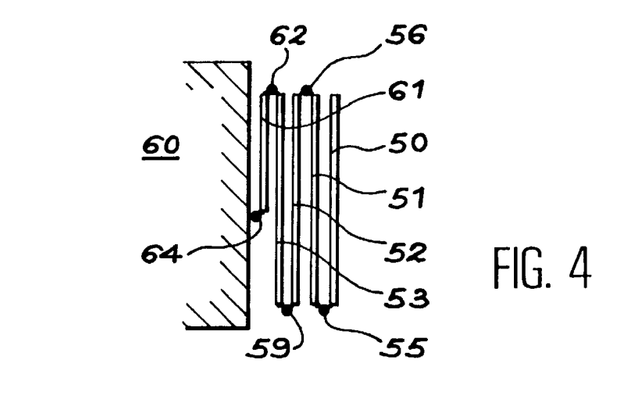
FIG. 4 is a side view showing diagrammatically the solar array in FIG. 3 in the folded storage position.
Figure 5:
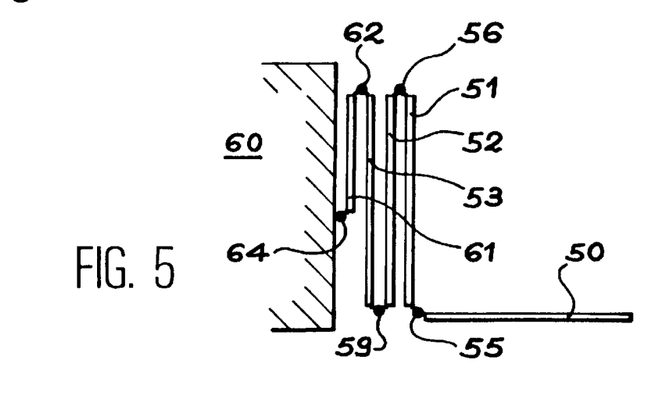
FIG. 5 is a view comparable to FIG. 4, showing the solar array in the partially deployed transfer configuration.

In the embodiment example shown diagrammatically in FIGS. 3 to 5, a solar array has been shown including four flaps 50, 51, 52 and 53 connected to each other according to an accordion configuration.

More precisely, each pair of adjacent flaps is connected by two coaxial joints. Thus, the last flap 50 is connected to the adjacent flap 51 by two articulations 54 and 55, the flap 51 is connected to the flap 52 by two articulations 56 and 57, the flap 52 is connected to the base flap 53 by two articulations 58 and 59.

The connection between the solar array thus constituted and the structure 60 of the satellite (FIGS. 4 and 5) is provided by a trapezium-shaped part 61, itself articulated on the one hand on the flap. 53 by two articulations 62 and 63 and, on the other hand, on the structure 60 of the space vehicle by an articulation 64, generally called a wing root articulation.

The articulations connecting the flaps 50 to 53, the part 61 and the structure 60 define parallel pivoting axes and are arranged in such a way that the unit can pass from the folded storage configuration shown in FIG. 4, in which the flaps 50 to 53 and the part 61 are folded up over each other and against the structure 60 of the vehicle, in the fully deployed configuration shown in FIG. 3, in which the flaps 50 to 53 and the part 61 are all placed in a same plane, perpendicular to the adjoining face of the structure 60 of the space vehicle.

In the embodiment shown, into one of the articulations 54 connecting the flaps 50 and 51 a first control device according to the invention has been built, so as to be able to make the solar array move from its fully folded storage configuration shown in FIG. 4 into its partially deployed transfer configuration shown in FIG. 5. In this partially deployed configuration, the flaps 51, 52 and 53 and the part 61 remain fully folded against the structure 60 and the last flap 50 is deployed at about 90° relative to the adjacent flap 51.

Furthermore, a second control device according to the invention is built into the other articulation 55 which connects the flaps 50 and 51, so as to control the passage of the solar array from its partially deployed transfer configuration shown in FIG. 5 into its fully deployed configuration shown in FIG. 3.

Interlocking means connect the different articulations, so that the effect of deploying the flap 50 from 90° to 180° is a synchronised deployment of flaps 51, 52 and 53, from 0° to 180° and a deployment of the part 61 from 0° to 90°. These interlocking means are shown diagrammatically in FIG. 4. They include, for example, in a known way, a first cable 65 mounted on pulleys associated with the articulations 55 and 56, a second cable 66 mounted on pulleys associated with the articulations 57 and 58, a third cable 67 mounted on pulleys associated with the articulations 59 and 62, and a fourth cable 68 mounted on pulleys associated with articulations 63 and 64.

A description will now be given in more detail of the articulation 54, by referring to FIG. 6.

This articulation 54 builds in a first relative rotation control device according to the invention, denoted generally by the reference 69a.

The torsion bar of bistable shape memory alloy, centred on the axis 14 of the articulations 54 and 55 is recognised as 16a. The heating means fitted to the bar 16a over its whole length is also recognised as 24a.

An end piece 30a connects in rotation a first end of the torsion bar 16a to a female clevis 32a, provided to be fixed on the flap 51. The female clevis 32a supports a male clevis 46a fixed to the flap 50, by means of a journal 48a placed along the axis 14.

At its opposite end, the torsion bar 16a is extended along the axis 14 by a part 34a, in which are made, all in one piece, a connection support plate 20a, a fuse 18a and a piston 36a.

The piston 36a is received in a blind hole 39a machined in an end piece 38a fixed to a mounting 44a of the flap 50. More exactly, the piston 36a is connected in rotation to the end piece 38a, while being mobile in translation along the axis 14. A compression spring 40a is confined between the piston 36a and the bottom of the blind hole machined in the end piece 38a. This spring 40a allows the different elements of the control device 69a to be kept in place after the possible fracture of the fuse 18a.

A cylindrical cowling 42a surrounds coaxially the control device 69a, over its whole length. The cowling 42a is fixed to the mounting 44a by one of its ends and centred on the end piece 30a by its opposite end.

Figure 7:
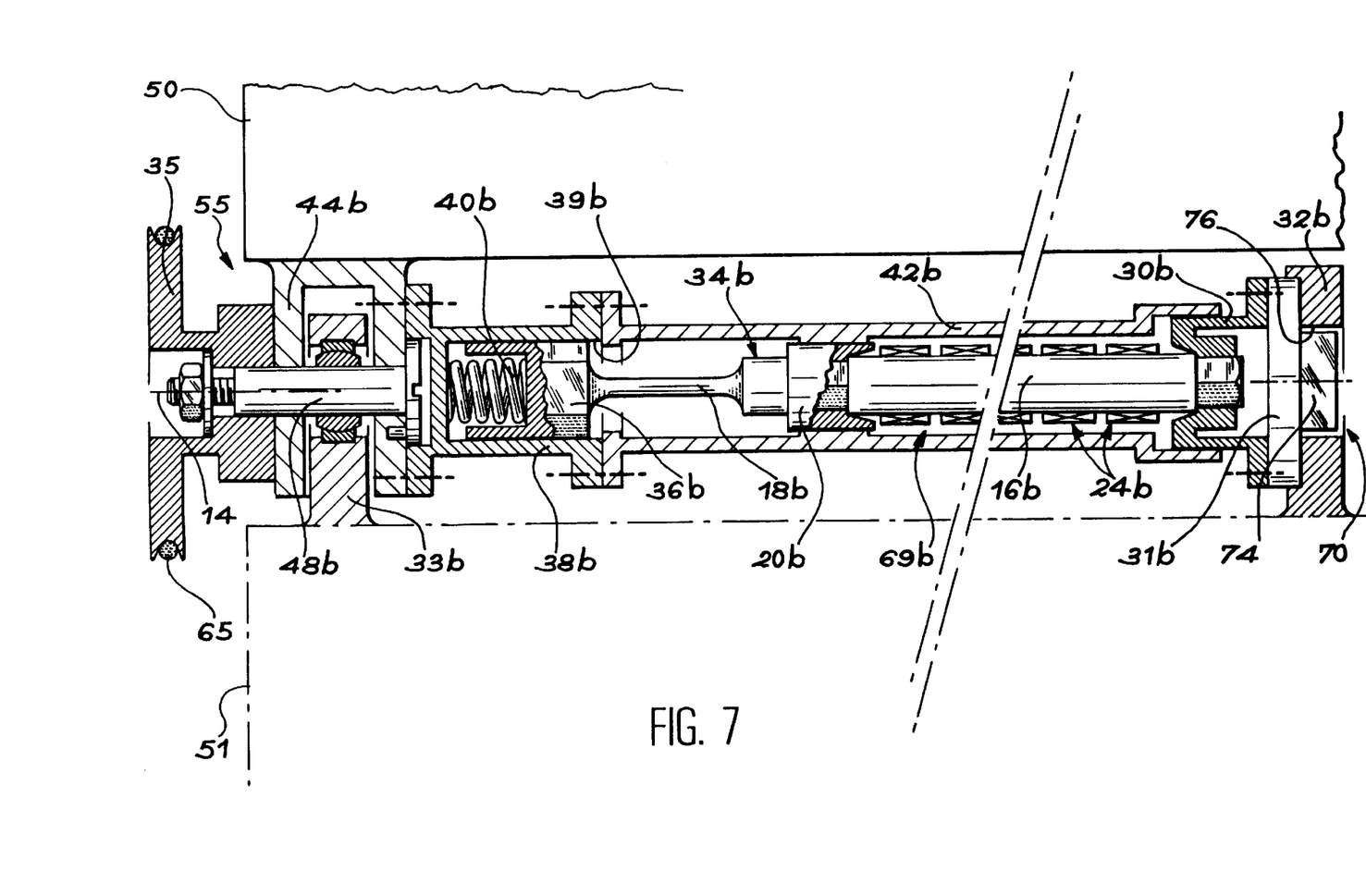
FIG. 7 is a longitudinal section view which shows a second joint of the solar array, into which is built a second control device according to the invention, used to bring the array into its fully deployed configuration in FIG. 3.

FIG. 7 shows the second articulation 55, interposed between the flaps 50 and 51 of the solar array. This second articulation 55 builds in a second control device according to the invention, denoted generally by the reference 69b.

The torsion bar 16b, in a bistable shape memory alloy, of the control device 69b, and the heating means 24b of this bar can be seen in FIG. 7. The torsion bar 16b is also centred on the axis 14 common to articulations 54 and 55.

An end piece 30b connects in rotation a first end of the torsion bar 16b to a disk 31b, itself centred in a mounting 32b, fixed to the flap 51.

At its opposite end, the torsion bar 16b is extended along the axis 14 by a part 34b, in which are made, all in one piece, a connection support plate 20b, a fuse 18b and a piston 36b.

The piston 36b is received in a blind hole 39b machined in an end piece 38b, fixed to a female clevis 44b connected to the flap 50. More exactly, the piston 36b is connected in rotation to the end piece 38b, while being free in translation along the axis 14. A compression spring 40b is confined between the piston 36b and the bottom of the blind hole 39b. This spring 40b allows the different elements of the control device 69b to be kept in place after the possible fracture of the fuse 18b.

The female clevis 44b supports a male clevis 33b, fixed to the flap 51, by means of a journal 48b placed along the axis 14. This journal 48b supports the pulley 35 on which passes the cable 65 of the interlocking means previously described.

A cylindrical cowling 42b surrounds coaxially the control device 69b, over its whole length. This cowling 42b is fixed to the end piece 38b by one of its ends and centred on the end piece 30b by its opposite end.

Figure 6:
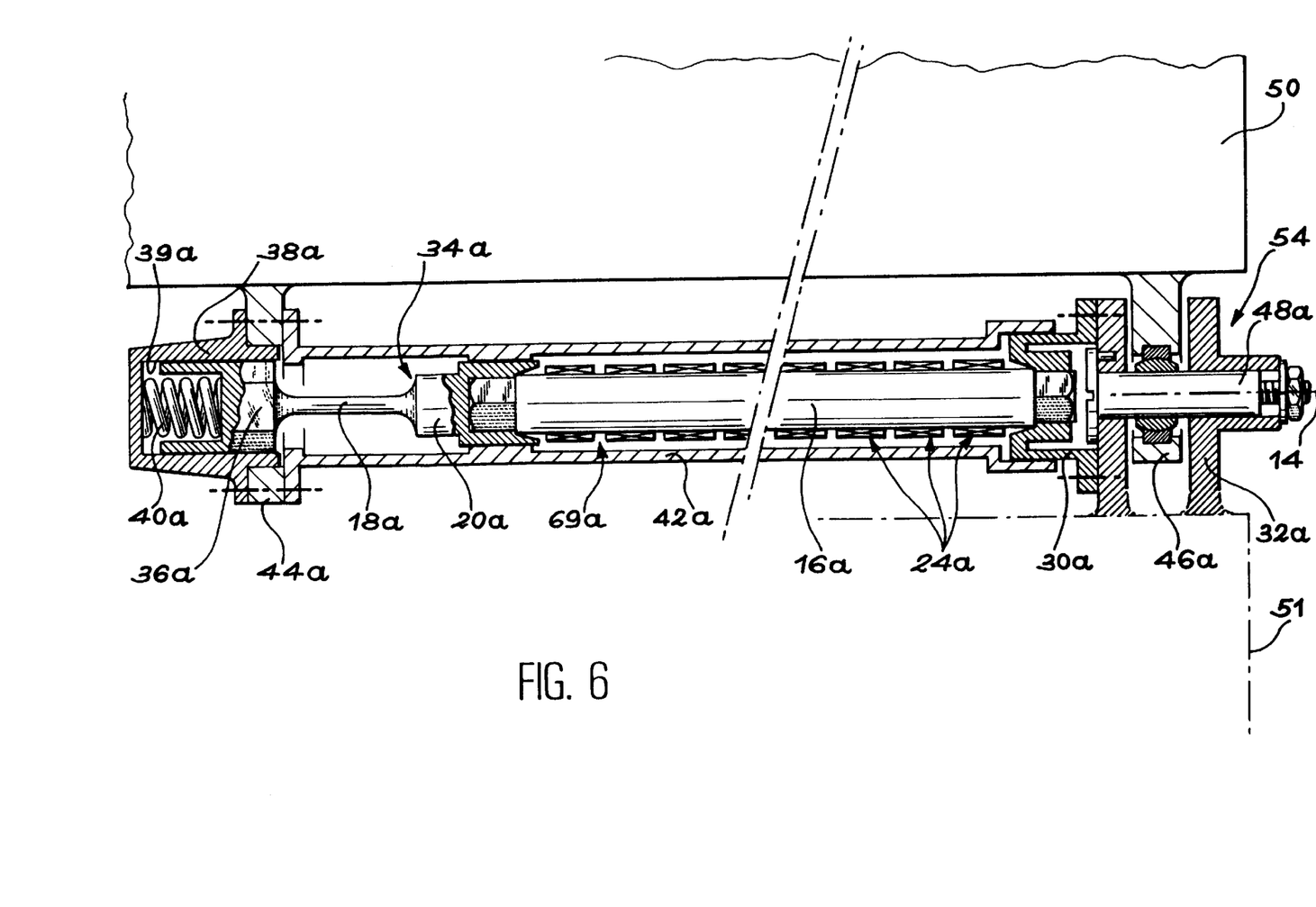
FIG. 6 is a partial longitudinal section view which shows a joint of the solar array in FIGS. 4 to 6, into which is built a first control device designed to bring the array into its partially deployed configuration of FIG. 5.

The articulation 55 also builds in play take-up means 70 which act as a stop restricting to 90° the partial deployment of the panel 50 during activation of the first control device 69a of FIG. 6. In other words, the play take-up means 70 fulfil the function of the stop 22 in FIGS. 1A to 1C for the control device 69a.

The function of the play take-up means 70 is, moreover, to allow the free rotation of the flap 50 relative to the flap 51, until its partially deployed configuration in FIG. 5, then to provide the engagement of these two flaps 50 and 51 when the full deployment of the solar array is to be controlled by the device 69b.

These play take-up means 70 are interposed between the disk 31b and the mounting 32b, fixed to the flap 51 of the solar array. They include a key 74, which projects on the face of the disk 31b opposite the end piece 30b, in a housing 76 formed in the mounting 72. The key 74 is connected in rotation to the flap 50, by means of the torsion bar 16b, of the part 34b, of the end piece 38b and of the female clevis 44b.

Figures 8A, 8B, 8C:
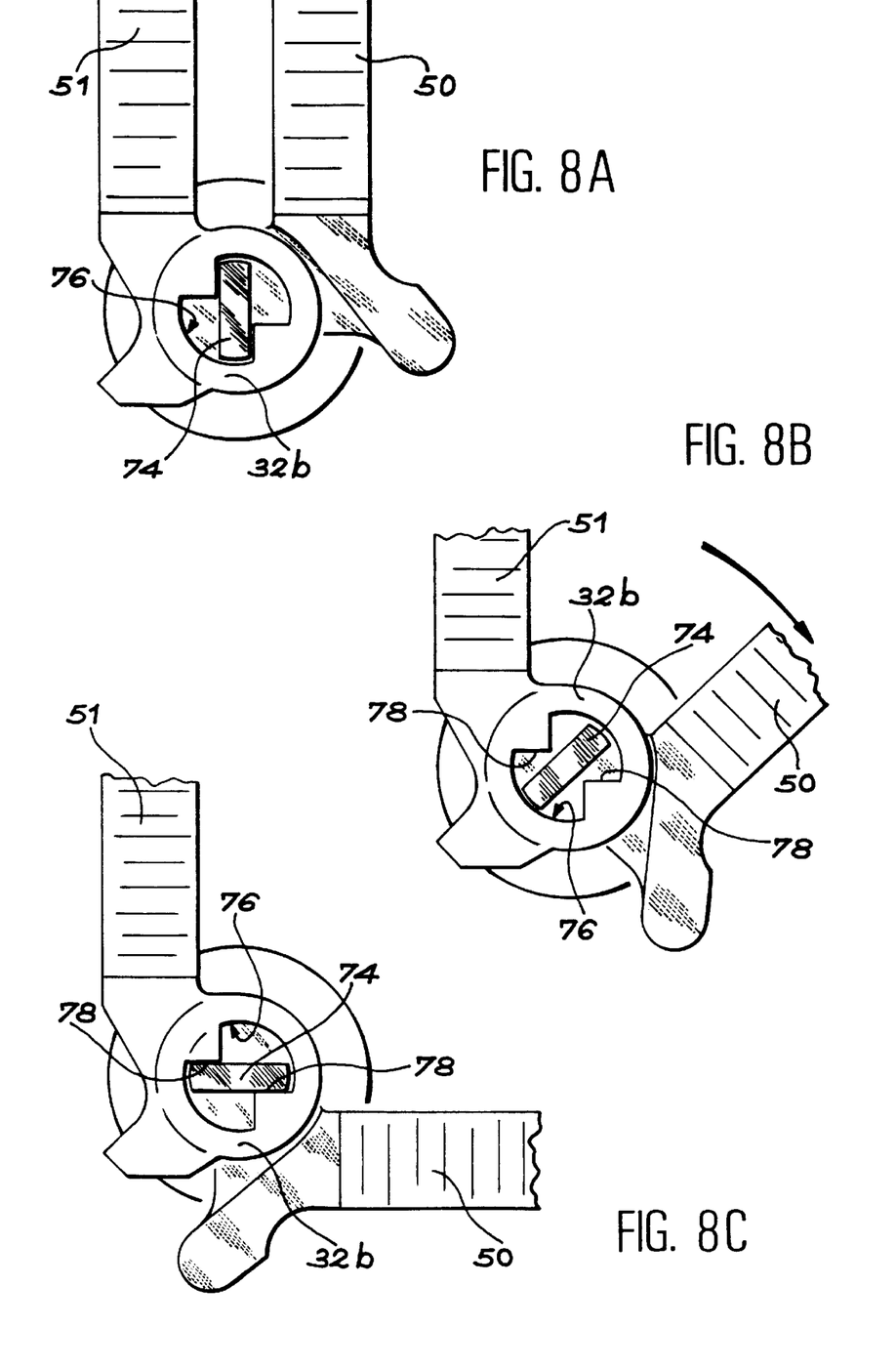
FIGS. 8A, 8B and 8C are end views of the second control device of FIG. 8, showing the play take-up means which are fitted to this device, successively in the folded configuration of the solar array, during partial deployment and in its partially deployed configuration of FIG. 5.

As shown more precisely in FIGS. 8A to 8C, the shape of the housing 76 is such that it allows relative pivoting between the key 74 and the mounting 72, restricted in this case to 90°, in the direction of deployment of the flap 50. In the initial folded configuration shown in FIG. 8A, the key 74 is oriented parallel to the flap 51. As partial deployment occurs controlled by activation of the device 69a in FIG. 6, the key 74 rotates in the groove 76 with the flap 50, until it is supported against stop surfaces 78 of the groove 76, as has been shown in FIG. 8C. All additional rotation of the flap 50 is then prevented, so long as the control device 69b is not activated. The fuse of the control device 69a in FIG. 6 is then activated, in order to absorb the torque which continues to be generated by the torsion bar 16a of the control device 69a.

Figure 9A:
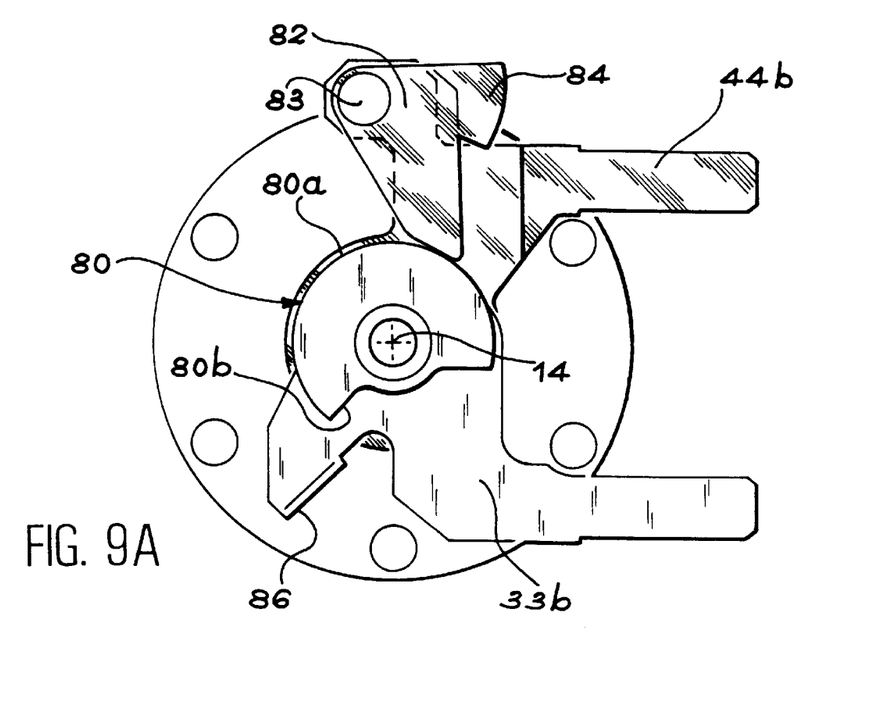
FIGS. 9A and 9B show the reverse running stop locking means which are fitted to each of the control devices of FIGS. 6 and 7, respectively in their initial unlocked configuration and in their locked configuration, reached when the required relative rotation has been achieved.
Figure 9B:
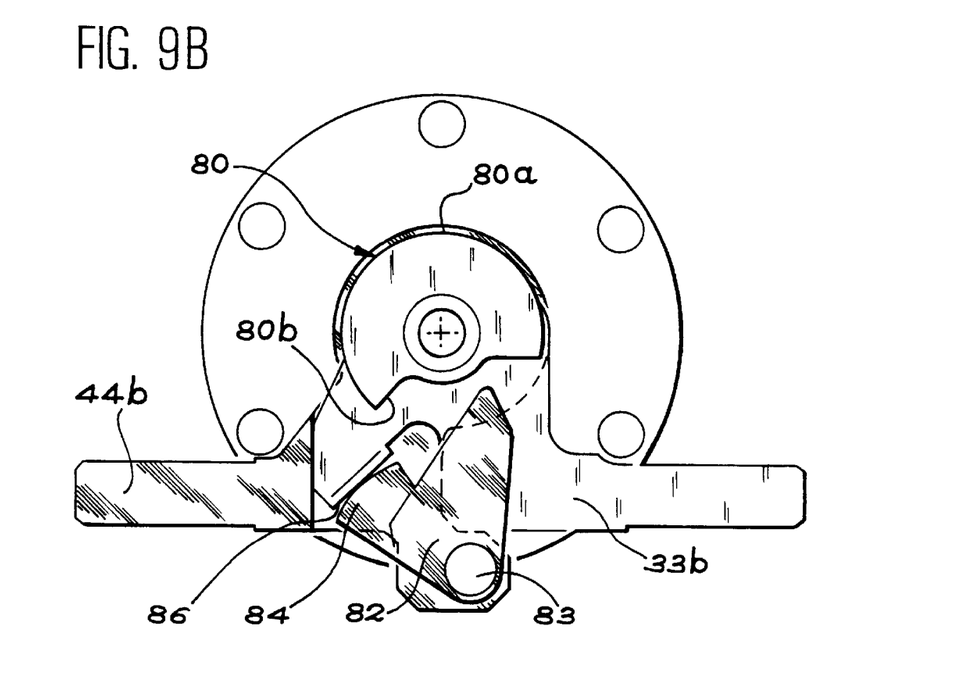

In FIGS. 9A and 9B are shown diagrammatically reverse running stop locking means fitted to each of the articulations 69a and 69b. These reverse running stop locking means can be constituted by any locking means known to the specialist, with the result that the description of FIGS. 9A and 9B is given only as a non-restrictive example.

Moreover, the description made in reference to the articulation 55 in FIG. 7 can be transposed identically for the articulation 54 in FIG. 6 (the reverse running stop locking being carried out after a rotation of 90°, and not of 180°).

The clevis 33b, connected to the fixed flap 51 of the articulation comprises a guide 80, centred on its axis 14. A keeper 82 is articulated by an axis 83 on the clevis 44b, connected to the mobile flap 50 of the articulation, and kept in contact with the guide 80 by a torsion spring (not shown) built into its axis 83. The keeper 82 carries a latch 84, capable of placing itself opposite a mechanical stop 86, mounted, like the guide 80, on the clevis 33b.

The guide 80 has, on the part 80a of its circumference corresponding to the required deployment angle (here, 180°), a cylindrical configuration centred on the axis 14 of the articulation. So long as the keeper 82 is in contact with this cylindrical part 80a of the guide 80, the latch 84 is kept separated from the axis of articulation and reverse running is possible.

Beyond this cylindrical part 80a, the guide 80 comprises a hollow part 80b. When the keeper 82 arrives opposite this hollow part 80b under the effect of the relative rotation between the two elements controlled in turn by the devices 69a and 69b according to the invention, the keeper 82 is released and pivots towards the axis of articulation, under the action of the torsion spring built into its axis. The latch 84 then comes to place itself opposite the mechanical stop 86, with the result that a relative pivoting in the reverse direction between the two flaps 50 and 51 is impossible.

In practice, the start of the hollow part 80b of the guide 80 is positioned so that the pivoting of the keeper 82 intervenes at the exact moment when the two flaps have pivoted relative to each other from the desired angle. This is then the deployed configuration shown in FIG. 9B.

To complete the description of the solar array of FIGS. 3 to 5, it will be observed that articulations devoid of control devices according to the invention can be fitted with springs giving low motor torque, so as to restrict locking jar to the admissible level and to guarantee locking of the articulations at 90° for the wing root articulation 64 and at 180° for interflap articulations 56 to 59 and 62, 63.

In the example described, the partial transfer deployment, then the full deployment of the solar array are carried out in the following manner.

When the partial deployment of the last flap 50 is to be controlled in the transfer phase, a stacking device (not shown) of this flap is released. The control device 69a built into the articulation 54 is then activated. The flap 50 then opens gradually to 90° when the metallurgical conversion temperature of the alloy, from which the torsion bar 16a of the device 69a is made, is reached. Reverse running stop locking means, such as those which have been described by way of example in reference to FIGS. 9A and 9B, are then activated automatically in each of the articulations 54.

In parallel, flap interlocking means (cables 65 to 68 and associated pulleys) are locked by means of a catch (not shown) specific to one of the articulations.

During this phase of partial deployment to 90° of the last flap 50 of the solar array, the second control device 69b which is fitted to the articulation 55, rotates freely in the mounting 32b, until the key 74 is stopped against the end surfaces 78 of the groove 76. The control device 69b, which was therefore allowed to coast up to 90,° then participates by its support in keeping the flap 50 at 90° and thus makes control device 69a secure.

The fuse 18a fitted to the control device 69a is then acted upon, possibly until it fractures, so that the torsion bar 16a of the device 69a continues its rotation up to its training value (for example, about 100°) without engaging the flap 50.

The slowness of the folding mechanism allows the flap 50 to open and to lock at 90° without any jarring, with very substantial surplus in the folding mechanism (motor torque/resisting torque $\geq 5$). When the full deployment of the solar array is to be controlled, a second stacking device (not shown) is released and the second control device 69b is activated. Under the effect of this activation, the flaps 50 to 53 and the part 61 open in a synchronised way, thanks to the interlocking means, and very slowly thanks to the very slow rotation provided by the shape memory alloy constituting the torsion bar 16b of the control device 69b. The interlocking means are designed in such a way that the opening of the flap 50 from 90° to 180° is accompanied by the opening of the other flaps 51 to 53 from 0° to 180° and by the pivoting of the base part 61 from 0° to 90°.

The whole of the solar array is then locked by the activation of devices comparable to that which has been described in reference to FIGS. 9A and 9B and by a stop of the type of the stop 22 in FIGS. 1A to 1C. The torque which continues to be applied by the shape memory alloy torsion bar 16b of the second control device 69b is then borne by the fuse 18b of this second device. The rotation control thus continues up to the bar training value of about 100°, without engaging the flaps, possibly until the fuse 18b fractures. In this case too, the slowness of the folding mechanism allows the solar array to open fully and to lock in the deployed configuration without any jarring, and with a very substantial folding mechanism margin. This margin can be used to ensure deployment, in the event of an articulation line failure.

It should be noted that each of the control device 69a and 69b can easily be increased twofold, for example by fitting two control devices one after the other, in each of the articulations 54 and 55. The reliability of each of the two deployments (partial and full) to be controlled is thus ensured.

Clearly, the application which has just been described by reference to FIGS. 3 to 9B is only given as a non-restrictive example. Thus, the number of elements of the structure to be deployed can be unrestricted and the deployment control device or devices can be installed in other articulations of the structure. Thus, a single control device according to the invention can be installed in the wing root articulation 64, particularly when the structure to be deployed does not require partial deployment in a transfer phase.

Furthermore, it goes without saying that the control device according to the invention can be used to control the opening of any appendage fitted to a space vehicle, or of any other mechanical deployable structure.

Lastly, it should be noted that the shape memory alloy bar has a mechanical structure such that its mounting in the device is impossible if it has not been previously reconditioned in its reference position, after elementary trials. This mounting can particularly be obtained by giving to both bar ends geometric shapes such as imperfect hexagons.

What is claimed is:

1. A device for controlling a relative rotation between two elements articulated relative to each other around a given axis, the device including a torsion bar made of a bistable shape memory alloy, centered on said axis and connected to each of the elements at points spaced out along said axis, and bar heating means, activation of which generates said relative rotation, under the effect of a change in the metallurgical structure of the alloy, wherein the torsion bar is able to generate an angle of relative rotation between said points on the bar, greater than a pre-set angle of relative rotation to be controlled between the elements, a stop being provided to restrict the angle of relative rotation between the elements to said preset angle, and at least one mechanical fuse being provided between the torsion bar and a first of said elements, to absorb excess relative rotation between said points on the bar, beyond said pre-set angle.

2. A device according to claim 1, wherein the mechanical fuse is a rod of smaller cross section than the torsion bar, extending the torsion bar along said axis and the ends of which are connected in rotation to one end of the bar and to the first element respectively.

3. A device according to claim 2, wherein a resilient means is interposed between the rod and the first element, so as to act upon the first element towards the torsion bar, along said axis.

4. A device according claim 1, wherein the heating means include heaters distributed over the whole length of the torsion bar, stuck onto it and individually retained by hooping rings.

5. A device according to claim 1, wherein a reverse running stop locking mechanism is provided to oppose any reverse rotation, after said relative rotation between the elements.

6. A deployable mechanical structure, including at least two elements connected to each other by at least one articulation and initially occupying a folded configuration, and at least one control device built into said articulation, able to bring said structure into an at least partially deployed configuration, said device including a torsion bar made of a bistable shape memory alloy, centered on said axis and connected to each of the elements at points spaced out along said axis, and bar heating means, activation of which generates said relative rotation, under the effect of a change in the metallurgical structure of the alloy wherein the torsion bar is able to generate an angle of relative rotation between said points on the bar, greater than a pre-set angle of relative rotation to be controlled between the elements, a stop being provided to restrict the angle of relative rotation between the elements to said pre-set angle, and at least one mechanical fuse being provided between the torsion bar and a first of said elements, to absorb excess relative rotation between said points on the bar, beyond said pre-set angle.

7. A structure according to claim 6, including at least three elements connected to each other by at least one articulation, wherein at least one control device is built into one of the articulations and interlocking means connect the articulations to each other, so that activating the control device brings all the elements of the structure into the deployed configuration.

8. A structure according to claim 7, wherein at least a first control device is built into a first articulation connecting at least one last element of the structure to an adjacent element, to control a partial deployment of said at least one last element, and at least one second control device is built into a second articulation of the structure, to bring it into its deployed configuration, through the interlocking means.

9. A structure according to claim 8, wherein the second control device is connected to the last element through play take-up means able to engage when the partial deployment of the last element has been controlled by the first control device.

* * * * *